US008229660B2

(12) United States Patent
Sugimoto

(10) Patent No.: US 8,229,660 B2
(45) Date of Patent: Jul. 24, 2012

(54) IMAGE FORMING APPARATUS AND IMAGE FORMING METHOD

(75) Inventor: Hiroaki Sugimoto, Nagoya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 452 days.

(21) Appl. No.: 12/476,707

(22) Filed: Jun. 2, 2009

(65) Prior Publication Data

US 2009/0319168 A1 Dec. 24, 2009

(30) Foreign Application Priority Data

Jun. 18, 2008 (JP) ................................. 2008-159505

(51) Int. Cl.
*G01C 21/00* (2006.01)
(52) U.S. Cl. ....................................................... 701/200
(58) Field of Classification Search .................. 701/200, 701/201
See application file for complete search history.

(56) References Cited

U.S. PATENT DOCUMENTS

| | | | | |
|---|---|---|---|---|
| 5,559,707 | A * | 9/1996 | DeLorme et al. | 701/200 |
| 6,321,158 | B1 * | 11/2001 | DeLorme et al. | 701/201 |
| 6,725,154 | B2 * | 4/2004 | Kamikawa et al. | 701/208 |
| 6,999,875 | B2 * | 2/2006 | Tu | 701/211 |
| 7,158,878 | B2 * | 1/2007 | Rasmussen et al. | 701/208 |
| 7,599,790 | B2 * | 10/2009 | Rasmussen et al. | 701/208 |
| 7,627,420 | B2 * | 12/2009 | Ujino | 701/200 |
| 7,865,301 | B2 * | 1/2011 | Rasmussen et al. | 701/208 |
| 7,973,964 | B2 * | 7/2011 | Nino | 358/1.18 |
| 2006/0291000 | A1 * | 12/2006 | Maeda et al. | 358/452 |
| 2008/0068671 | A1 * | 3/2008 | Yoshida et al. | 358/450 |
| 2008/0091459 | A1 * | 4/2008 | Elgar et al. | 705/1 |
| 2009/0289955 | A1 * | 11/2009 | Douris et al. | 345/630 |

FOREIGN PATENT DOCUMENTS

| | | |
|---|---|---|
| JP | 10-239085 | 9/1998 |
| JP | 11-355496 A | 12/1999 |
| JP | 2007-531004 | 11/2007 |
| JP | 2008-039813 | 2/2008 |
| WO | WO 2005/104039 | 11/2005 |

OTHER PUBLICATIONS

Notification of Reason(s) for Refusal issued in the corresponding Japanese Patent Application No. 2008-159505 dated Apr. 13, 2010, and an English Translation thereof.

* cited by examiner

*Primary Examiner* — Mark Fadok
(74) *Attorney, Agent, or Firm* — Buchanan Ingersoll & Rooney PC

(57) ABSTRACT

An image forming apparatus is provided with a first communication portion that obtains route information from a server, a second communication portion that obtains, from the server, additional information relating to the route information, a synthesis portion that incorporates an image included in the additional information into an area that is contained in an image included in the route information and that excludes the route and generates composite information, and a printer that prints an image based on the composite information generated by the synthesis portion onto a recording medium.

20 Claims, 15 Drawing Sheets

IMAGE FORMING APPARATUS AND IMAGE FORMING METHOD

This application is based on Japanese Patent Application No. 2008-159505 filed on Jun. 18, 2008, the contents of which are hereby incorporated by reference.

BACKGROUND OF THE INVENTION

1. Field of the Invention

The present invention relates to an image forming apparatus such as an MFP, and an image forming method.

2. Description of the Related Art

Image forming apparatuses performing an image forming process have conventionally been used in offices of business, convenience stores, or various places of other kinds. Such image forming apparatuses are, for example, copiers, printers, facsimile machines, and multifunction devices called combination machines or Multi-Function Peripherals (MFPs).

In parallel with the improvement of the performance of image forming apparatuses, additional features thereof are continuously being developed. A variety of additional features of image forming apparatuses have already been developed.

For example, an image forming apparatus is proposed which has a function of automatically obtaining Hyper Text Markup Language (HTML) data from a World Wide Web (WWW) server based on an output schedule, and of printing, onto paper, an image based on the HTML data (refer to JP 11-355496A).

In some cases, such image forming apparatuses are installed in convenience stores. In the case where a user wishes to search for a route to a destination, he/she can stop at a convenience store and use an image forming apparatus installed therein to search for the route.

The user operates the image forming apparatus to access a WWW server; thereby to obtain map data indicating the entire map including the route from a start point to the destination. An image of the map data thus obtained is displayed on a display portion implemented by a liquid crystal display of an operational panel.

The user can also enlarge a part of the area of the entire map and print the enlarged part onto a separate sheet of paper. This enables the user to easily know route points, such as intersections, along the route to the destination.

In the conventional method described above, however, the entire map is printed onto a sheet of paper and an image corresponding to an enlarged map desired by a user is printed onto a separate sheet of paper, thereby resulting in the waste of paper resources. Further, it is inconvenient for the user to go to a destination with a plurality of printed materials, and it is also burdensome for the user to find a necessary map from among the plurality of printed materials. Moreover, it is difficult to know which part of the entire map an area of the enlarged map printed on the separate sheet of paper corresponds to.

SUMMARY

The present disclosure is directed to solve the problems pointed out above, and therefore, an object of an embodiment of the present invention is to reduce unnecessary waste of paper resources and to provide a printed material corresponding to an easy-to-use map as compared to conventional apparatuses/methods.

According to one aspect of the present invention, an image forming apparatus is configured to communicate with a server that provides route information indicating a route from a start point to a destination. The image forming apparatus includes a route information obtaining portion that obtains the route information from the server, an additional information obtaining portion that obtains, from the server, additional information relating to the route information, a synthesis portion that incorporates an image included in the additional information into a first area that is contained in an image included in the route information and that excludes the route, and generates composite information, and a printer that prints an image based on the composite information generated by the synthesis portion onto a recording medium.

DESCRIPTION OF THE PREFERRED EMBODIMENTS

First Embodiment

Figure 1:
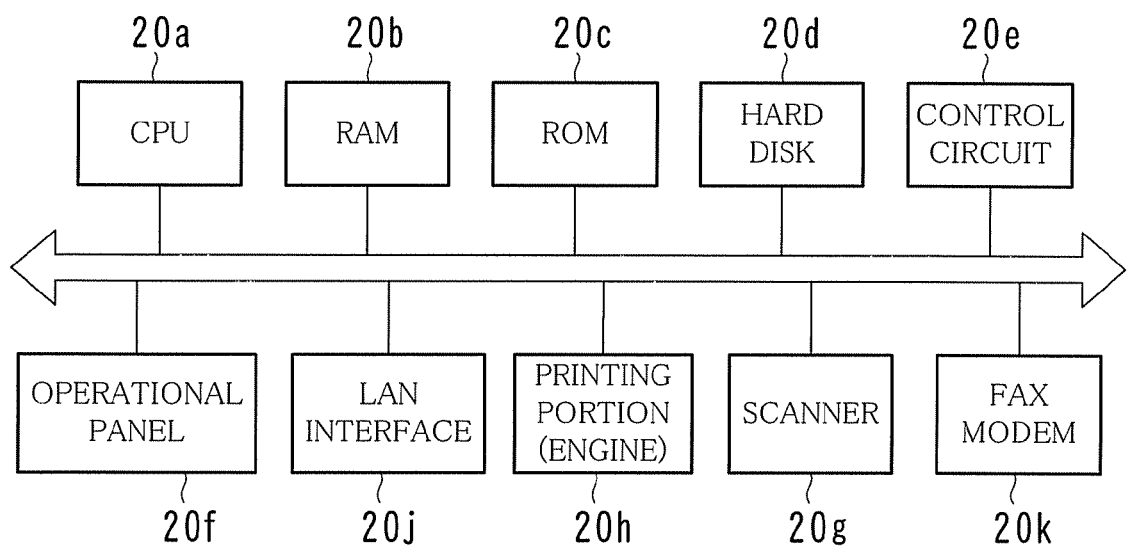
FIG. 1 is a diagram illustrating an example of the hardware configuration of an image forming apparatus.
Figure 1:
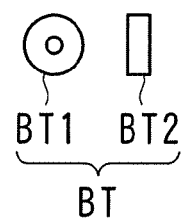
Figure 2:
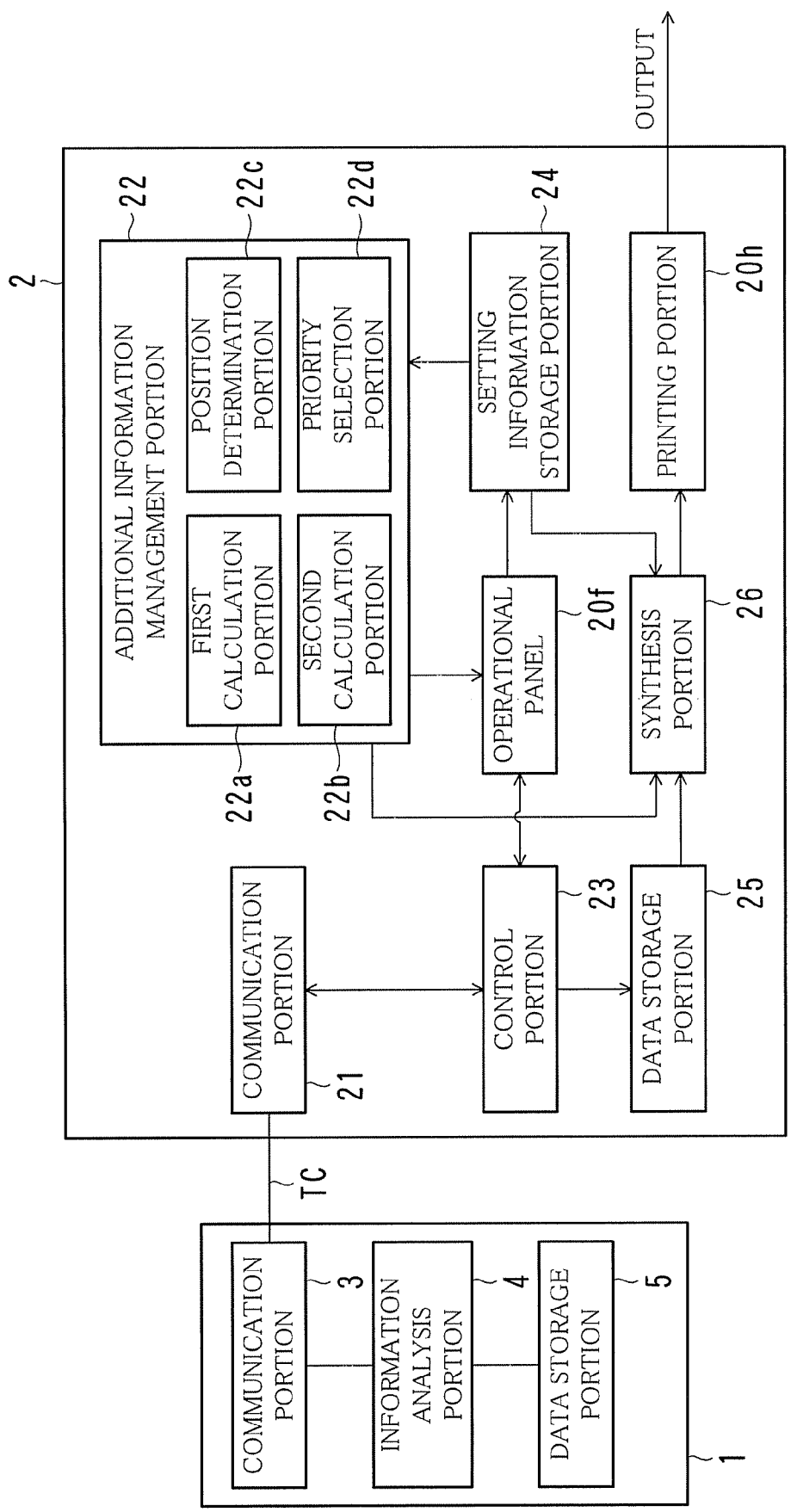
FIG. 2 is a diagram illustrating an example of the functional configuration of an image forming apparatus.
Figure 3:
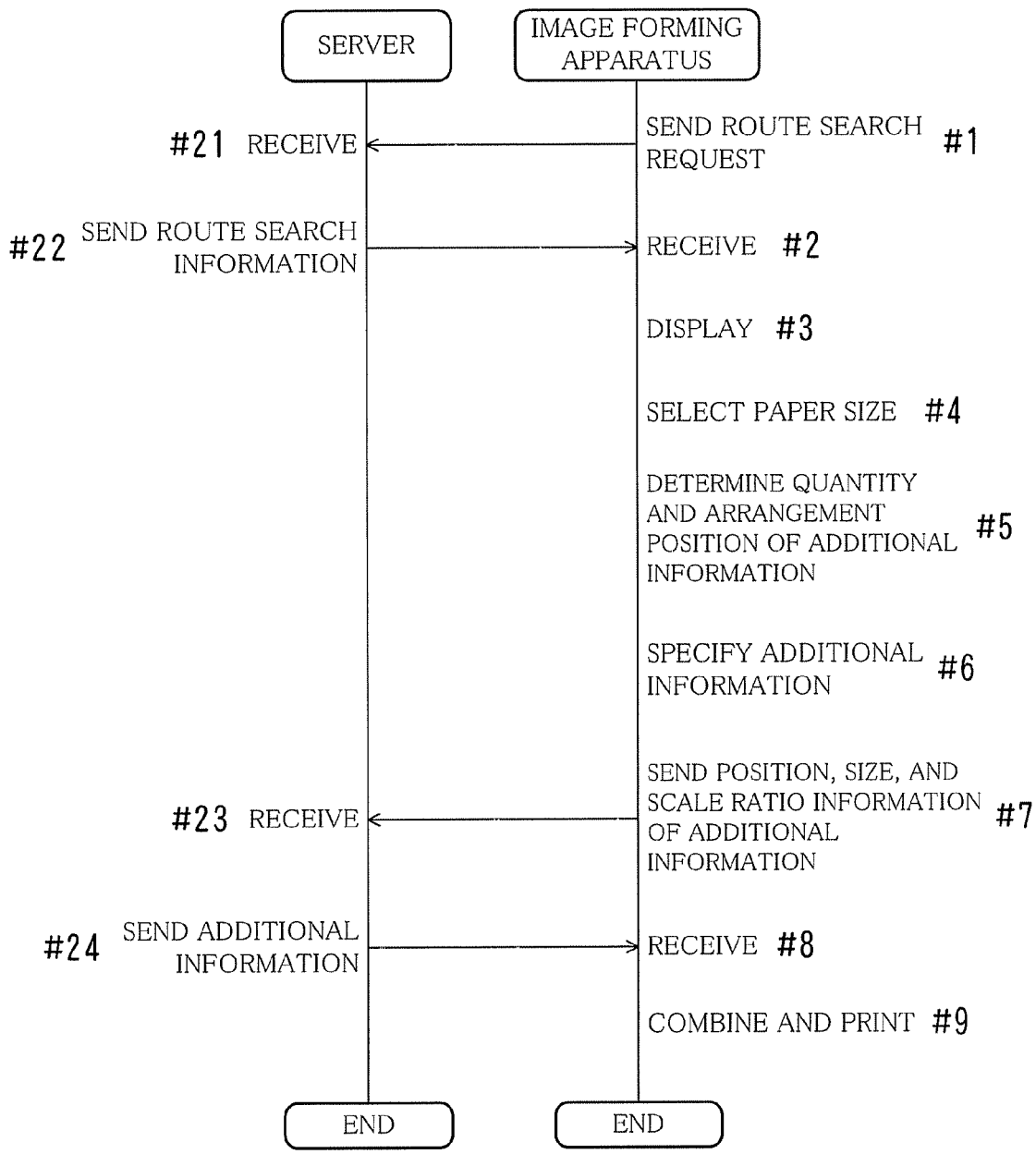
FIG. 3 is a sequence diagram illustrating an example of events between an image forming apparatus and a server.
Figure 4:
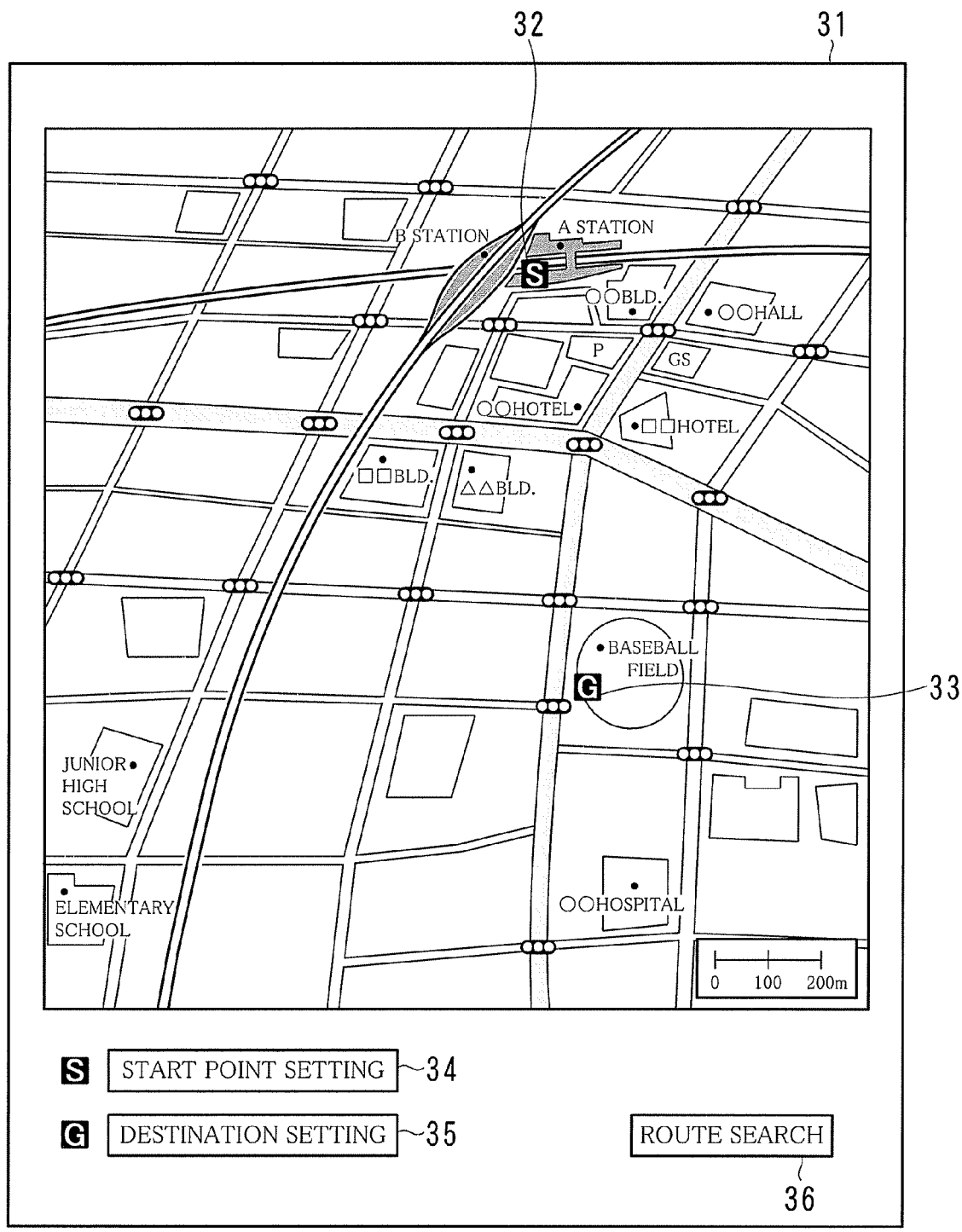
FIG. 4 is a diagram illustrating an example of a screen used when route search is performed.
Figure 5:
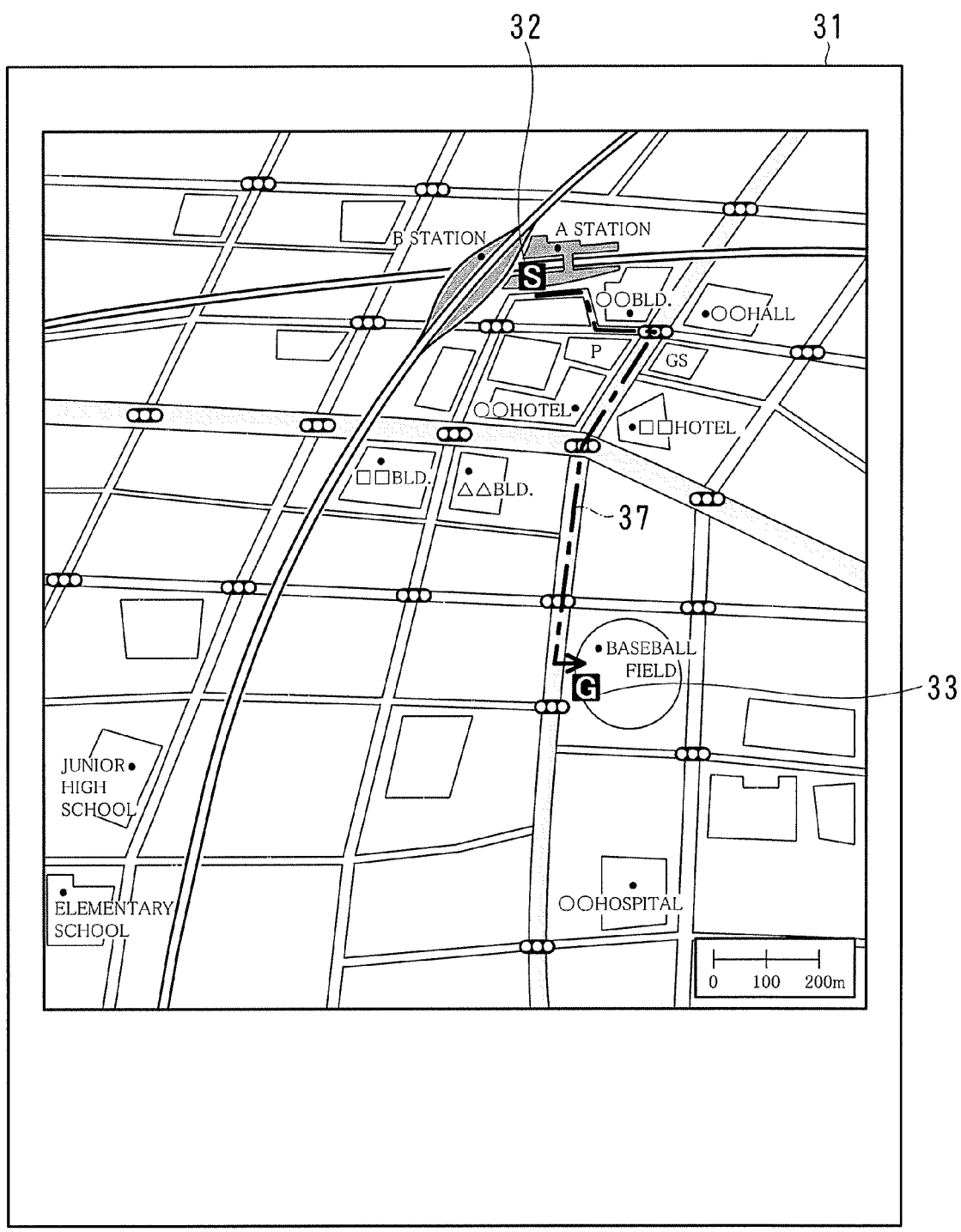
FIG. 5 is a diagram illustrating an example of a screen showing a route search result.
Figure 6:
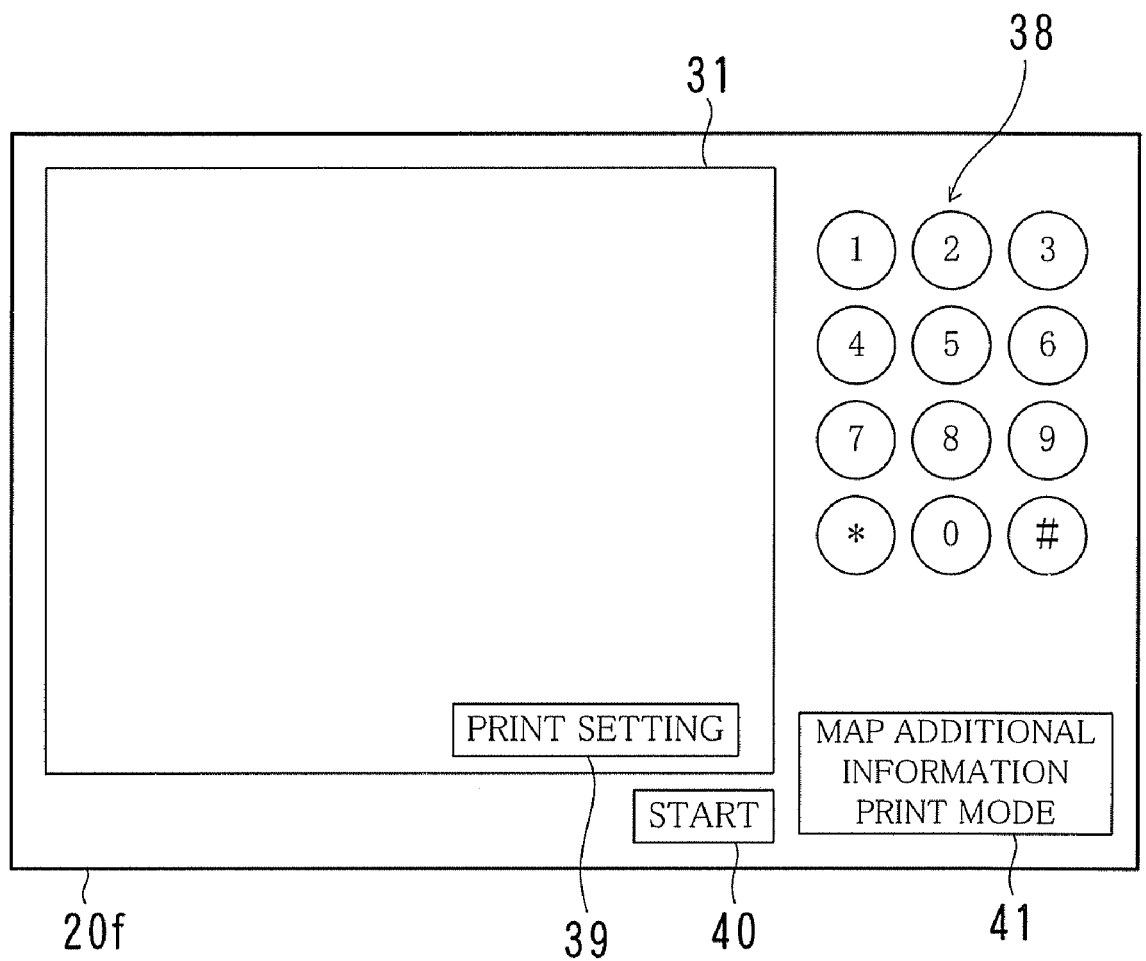
FIG. 6 is a diagram illustrating an example of a display portion of an operational panel.
Figure 7:
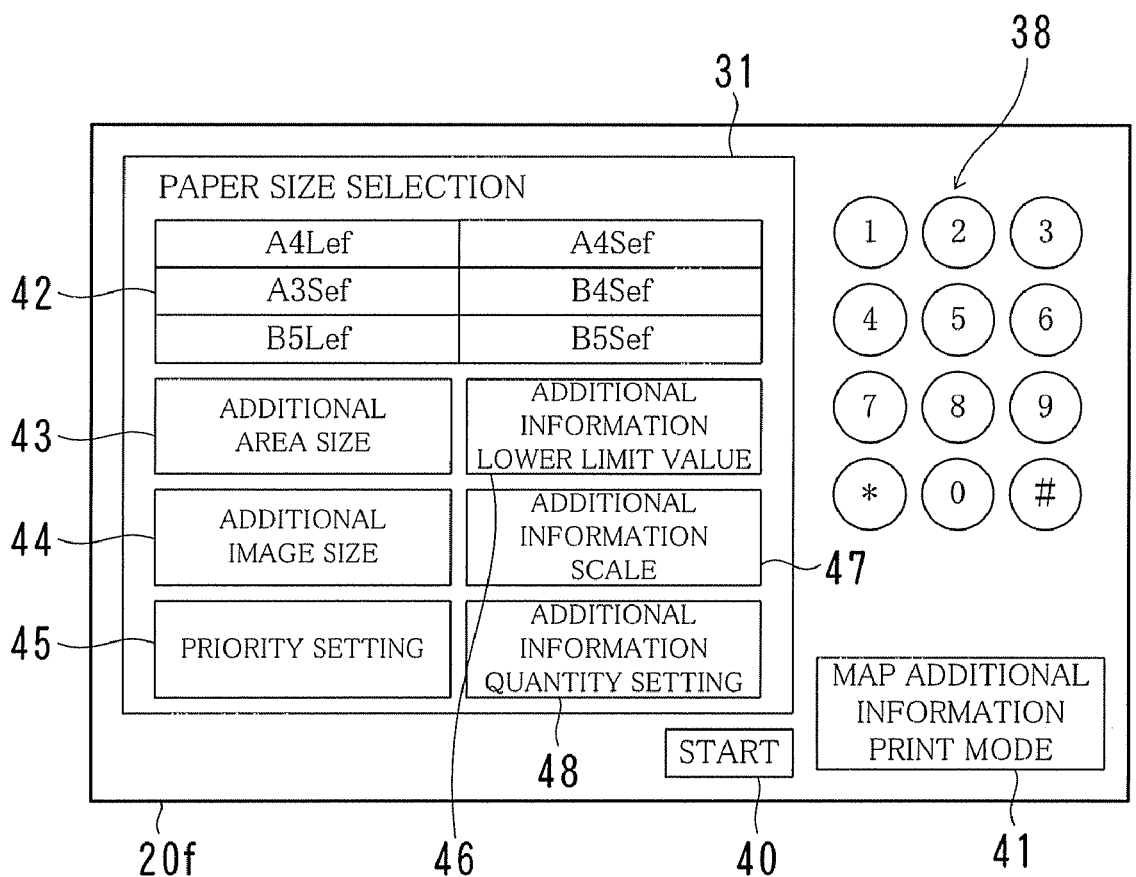
FIG. 7 is a diagram illustrating an example of a display portion of an operational panel.
Figure 8:
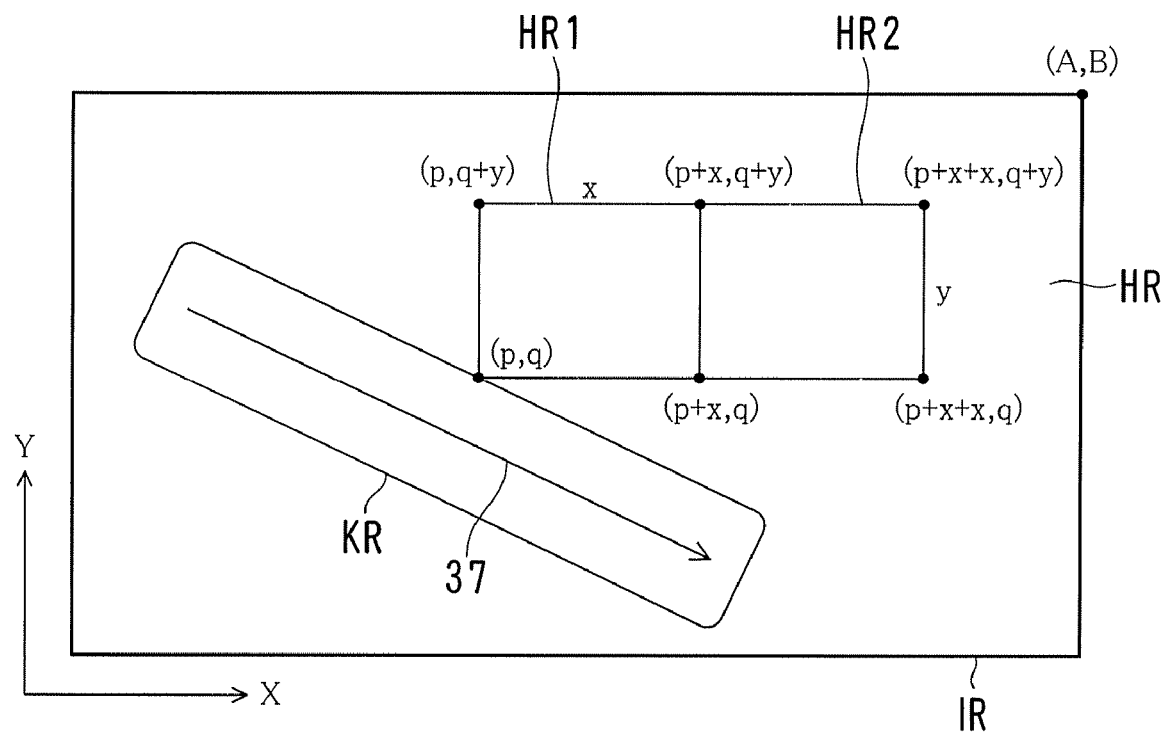
FIG. 8 is a diagram illustrating an example of an algorithm for depicting a synthesis method for an image included in additional information.
Figure 9:
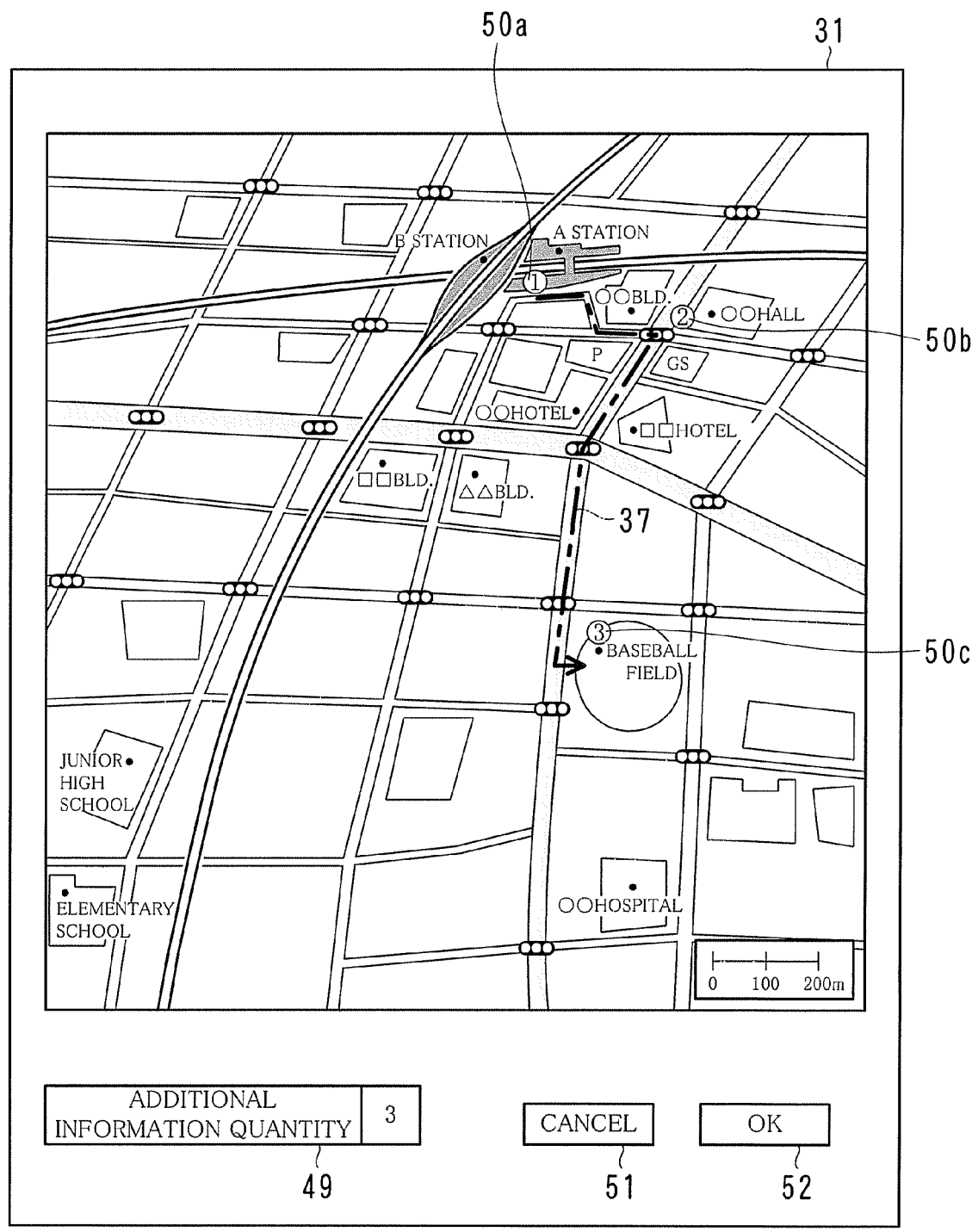
FIG. 9 is a diagram illustrating an example of a screen used for selecting additional information.
Figure 10:
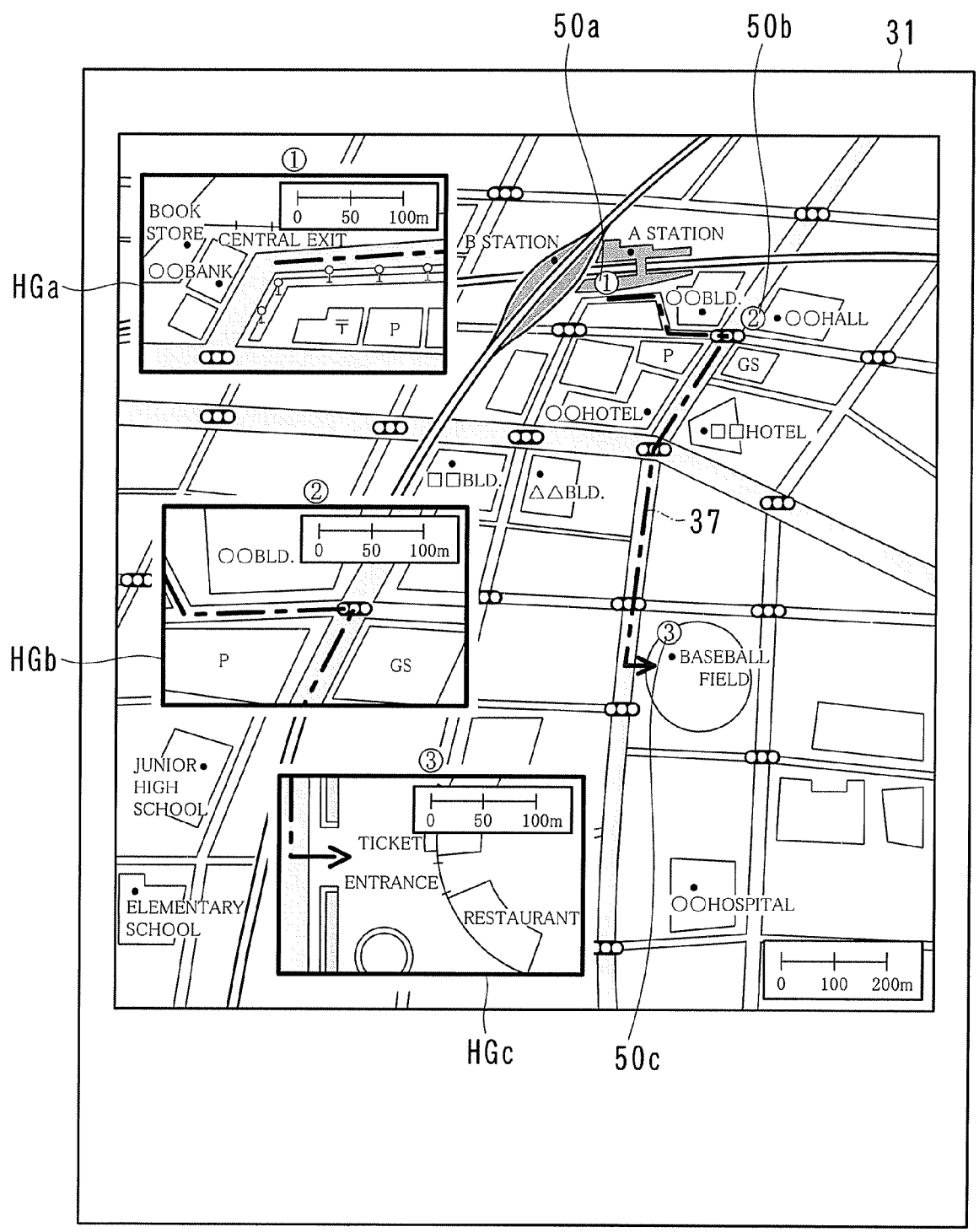
FIG. 10 is a diagram illustrating an example of a screen in which images included in additional information are incorporated.

FIG. 1 is a diagram illustrating an example of the hardware configuration of an image forming apparatus 2; FIG. 2 is a diagram illustrating an example of the functional configuration of the image forming apparatus 2; FIG. 3 is a sequence diagram illustrating an example of events between the image forming apparatus 2 and a sever 1; FIG. 4 is a diagram illustrating an example of a screen used when route search is performed; FIG. 5 is a diagram illustrating an example of a screen showing a route search result; FIGS. 6 and 7 are diagrams illustrating examples of a display portion 31 of an operational panel 20*f*; FIG. 8 is a diagram illustrating an example of an algorithm for depicting a synthesis method for an image included in additional information; FIG. 9 is a diagram illustrating an example of a screen used for selecting additional information; and FIG. 10 is a diagram illustrating an example of a screen in which images included in additional information are incorporated.

The image forming apparatus 2 is a processing device that integrates a variety of functions, such as copying, scanning, faxing, network printing, document server, and so on, into a single unit. Such apparatuses are sometimes called combination machines or Multi-Function Peripherals (MFPs).

A "document server" is a function of providing and managing storage areas that correspond to folders, directories, or the like in a personal computer, which are referred to as "personal boxes" or "boxes" for each user. This may also be referred to as a "box function". A user can store image data or the like in his/her personal box on a file-by-file basis.

The image forming apparatus 2 is installed in offices of a public institution (government, local self-governing body), a company, or the like, public facilities such as schools or libraries, or various other locations, and can be used by a plurality of users.

Referring to FIG. 1, the image forming apparatus 2 is configured of a CPU 20a, a RAM 20b, a ROM 20c, a hard disk 20d, a control circuit 20e, an operational panel 20f, a scanner 20g, a printing portion (engine) 20h, a LAN interface 20j, a FAX modem 20k, and so on.

The control circuit 20e is a circuit for controlling the hard disk 20d, the operational panel 20f, the scanner 20g, the printing portion 20h, the LAN interface 20j, the FAX modem 20k, and so on.

The scanner 20g optically reads images of contents printed on paper, such as text, formulas, symbols, photographs, charts, illustrations, and the like, and creates image data thereof.

The printing portion 20h prints an image, and the like onto paper based on the image data obtained by the scanner 20g or image data obtained externally.

The LAN interface 20j is a Network Interface Card (NIC) for communicating with, for example, a different image forming apparatus, and is used for connecting the image forming apparatus 2 with a hub or a router.

The FAX modem 20k is a device for communicating with, for example, a different image forming apparatus or a fax terminal based on a facsimile protocol.

The operational panel 20f is configured of a display portion realized by a touch-panel liquid crystal display and an operational portion realized by a numeric keypad and the like. On the display portion are displayed, for example, a screen for giving a message or instructions to a user, a screen for the user to enter a type of a desired process and process conditions, and a screen for indicating the results of processes executed by the CPU 20a or the like.

The user sees the screens described above and operates the display portion or the operational portion. Thereby, the user can provide a command to start or stop the execution of a process, specify processing conditions, e.g., a data destination, printing conditions, or scanning conditions, and specify various other items to the image forming apparatus 2. The operational panel 20f therefore serves as a user interface through which the user operates the image forming apparatus 2.

Referring to FIG. 2, the image forming apparatus 2 is configured of a communication portion 21, an additional information management portion 22, a control portion 23, a setting information storage portion 24, a data storage portion 25, a synthesis portion 26, and the like. The control portion 23 controls, for example, communication performed by the communication portion 21, display performed by the display portion of the operational panel 20f, and data saving from the server 1 to the data storage portion 25. The server 1 is configured of a communication portion 3, an information analysis portion 4, a data storage portion 5, and the like. The server 1 provides, for example, Web sites each of which includes one or more Web pages.

The image forming apparatus 2 is connected to the server 1 via a communication line TC. The Internet, a LAN, a public line, a wireless line, a dedicated line, or the like may be used as the communication line TC.

The CPU 20a executes programs stored in the RAM 20b or the ROM 20c, thereby to functionally implement the additional information management portion 22, the control portion 23, the setting information storage portion 24, the data storage portion 25, and the synthesis portion 26. Such programs can be installed from a portable recording medium BT (see FIG. 1), for example, a recording medium BT1 such as a CD-ROM or a DVD-ROM having the programs recorded thereon, and a recording medium BT2 such as a semiconductor memory. Alternatively, the programs can be downloaded from the server via a network.

In some cases, the whole or a part of the additional information management portion 22, the control portion 23, the setting information storage portion 24, the data storage portion 25, and the synthesis portion 26 is integrated as an IC such as an Application Specific Integrated Circuit (ASIC) and implemented by firmware or hardware.

The following is a description of a case in which a user uses a Web browser via the image forming apparatus 2, and searches for a route from a start point (for example, a station) to a destination (for example, a baseball field).

In a route search result obtained from the server 1, i.e., in the entire image included in route information indicating a route from a start point to a destination, the respective portions illustrated in FIG. 2 can incorporate an additional image into the entire image. To be specific, an image of an area other than an area including the route is replaced with the additional image. The additional image is included in additional information for enlarging and specifying a route point position and its vicinity, designated by the user, along the route. The detailed description is provided below.

A user uses a Web browser via the operational panel 20f, and designates a start point and a destination. As illustrated in FIG. 4, for example, the user performs predetermined operation in the display portion 31 of the operational panel 20f to designate a start point 32, and presses a start point setting button 34; thereby to set the start point. Likewise, the user performs predetermined operation to designate a destination 33, and presses a destination setting button 35; thereby to set the destination. After that, the user presses a route search button 36.

Responding to this, as exemplified in FIG. 3, the communication portion 21 sends a route search request to the server 1 under the control of the control portion 23 (#1). Note that the image forming apparatus 2 communicates with the server 1 based on an HTTP protocol.

When the server 1 receives the route search request from the image forming apparatus 2 (#21), the information analysis portion 4, and the like search for a route from the start point to the destination, and the server 1 sends, to the image forming apparatus 2, route information that is the route search result (#22).

When the image forming apparatus 2 receives the route information from the server 1 (#2), the control portion 23 controls the display portion 31 to display an image included in the route information as exemplified in FIG. 5 (#3). In this case, a route line 37 indicating a route from the start point 32 to the destination 33 is shown in the image included in the route information. The route information is stored in the data storage portion 25.

Referring to FIG. 6, the operational panel 20f is configured of an operational portion 38 implemented by, for example, a numeric keypad, a start key 40 for starting printing, a map additional information print mode key 41, and the like.

After the process of Step #3, the user selects a paper size (#4). At this time, the user presses a print setting button 39 on the display portion 31. Then, as exemplified in FIG. 7, the display portion 31 displays thereon a paper size selection button 42, an additional area size setting button 43, an additional image size setting button 44, a priority setting button 45, an additional information lower limit value button 46, an additional information scale button 47, and an additional information quantity setting button 48. The user can select a paper size by pressing a desired size on the paper size selection button 42. Information set by pressing the keys and buttons is stored in the setting information storage portion 24.

Then, the user sets an additional area size and an additional image size by pressing the additional area size setting button 43 and the additional image size setting button 44, respectively.

Incidentally, the additional area size means the size of an additional area HR. The additional area HR is an area obtained by removing, from a print area IR, an additional information synthesis prohibited area KR including the route line 37. The additional information synthesis prohibited area KR is an area where no image included in additional information is incorporated.

In this embodiment, the user designates a ratio (represented by %) of the size of the additional information synthesis prohibited area KR to the size of the print area IR. Thereby, a ratio (represented by %) of an additional area size, i.e., a ratio (represented by %) of the size of the additional area HR to the size of the print area IR is calculated. For example, if the user designates a value of 20% as the ratio of the size of the additional information synthesis prohibited area KR to the size of the print area IR, then the ratio of the additional area size is 80%. Stated differently, an image included in additional information is combined with the print area IR except the additional information synthesis prohibited area KR, i.e., with an area corresponding to 80% of the entire print area IR.

The additional image size means the size of an image included in additional information. The user can designate, as the additional image size, the longitudinal length and the transverse length of the image included in the additional information.

After the user has set the additional area size and the additional image size, a first calculation portion 22a and a position determination portion 22c of the additional information management portion 22 respectively determine the number of images included in additional information that can be combined with the additional area HR, and an arrangement position of that image (#5 of FIG. 3).

Referring to FIG. 8, for example, assuming that the size of the print area IR having the origin of coordinates (0, 0) on the X-axis and the Y-axis is denoted by (A, B), the additional image size designated by the user is denoted by (x, y), and coordinates of one point on the outer periphery of the additional information synthesis prohibited area KR is denoted by (p, q). In such a case, it is determined whether or not an image included in additional information can be arranged in an area other than the additional information synthesis prohibited area KR.

To be more specific, first, if "p+x<A" and "q+y<B" are satisfied, then an image included in the first additional information is arranged in an additional area HR1 enclosed by the line connecting coordinates of (p, q), (p+x, q), (p+x, q+y), and (p, q+y) as exemplified in FIG. 8.

Next, it is determined whether or not an image included in the second additional information can be arranged adjacent to the image arranged described above. To be more specific, if "p+x+x<A" and "q+y<B" are satisfied, then the image included in the second additional information is arranged in an additional area HR2 enclosed by the line connecting coordinates of (p+x, q), (p+x+x, q), (p+x+x, q+y), and (p+x, q+y) as exemplified in FIG. 8.

Such a process is repeated thereafter; thereby to determine where images included in additional information are to be arranged in the area other than the additional information synthesis prohibited area KR. The number of images to be arranged therein corresponds to the number of images calculated by the first calculation portion 22a.

Referring back to FIG. 3, the user performs predetermined operation in the operational panel 20f to specify desired additional information (#6).

As exemplified in FIG. 9, the user can designate one or more selection areas for which he/she desires to obtain enlarged image(s) specifying, for example, route point (s). The number of selection areas corresponds to the number of images calculated by the first calculation portion 22a and displayed in an additional information quantity display area 49. In FIG. 9, the number displayed in the additional information quantity display area 49 is "3"; therefore three selection areas 50a, 50b, and 50c are designated. The user presses a cancel button 51 in order to cancel the selection areas, and presses an OK button 52 in order to establish the selection areas.

If the user presses the OK button 52, then the communication portion 21 sends, to the server 1, information on the position, size, or scale ratio of the image included in the additional information (#7). Note that the scale ratio of the image included in the additional information can be set by using the additional information scale button 47.

When receiving the information on the position, size, or scale ratio of the image included in the additional information (#23), the server 1 sends additional information based thereon to the image forming apparatus 2 (#24).

The image forming apparatus 2 receives the additional information sent from the server 1 (#8). The additional information thus received is stored in the data storage portion 25.

The synthesis portion 26 (refer to FIG. 2) combines, based on the arrangement position determined by the position determination portion 22c, the image included in the route information, which has been received in Step #2, and the image included in the additional information, both of which are stored in the data storage portion 25. More specifically, the synthesis portion 26 deletes an area of the image included in the route information and corresponding to the arrangement position and overwrites the route information with the additional information so that the image included in the additional information is integrated into the area thus deleted.

FIG. 10 illustrates an image included in composite information produced as a result of the integration with the synthesis portion 26. Referring to FIG. 10, additional images HGa, HGb, and HGc corresponding to the selection areas 50a, 50b, and 50c, respectively are added. The printing portion 20h prints, onto paper, the image included in the composite information (#9).

Figure 11:
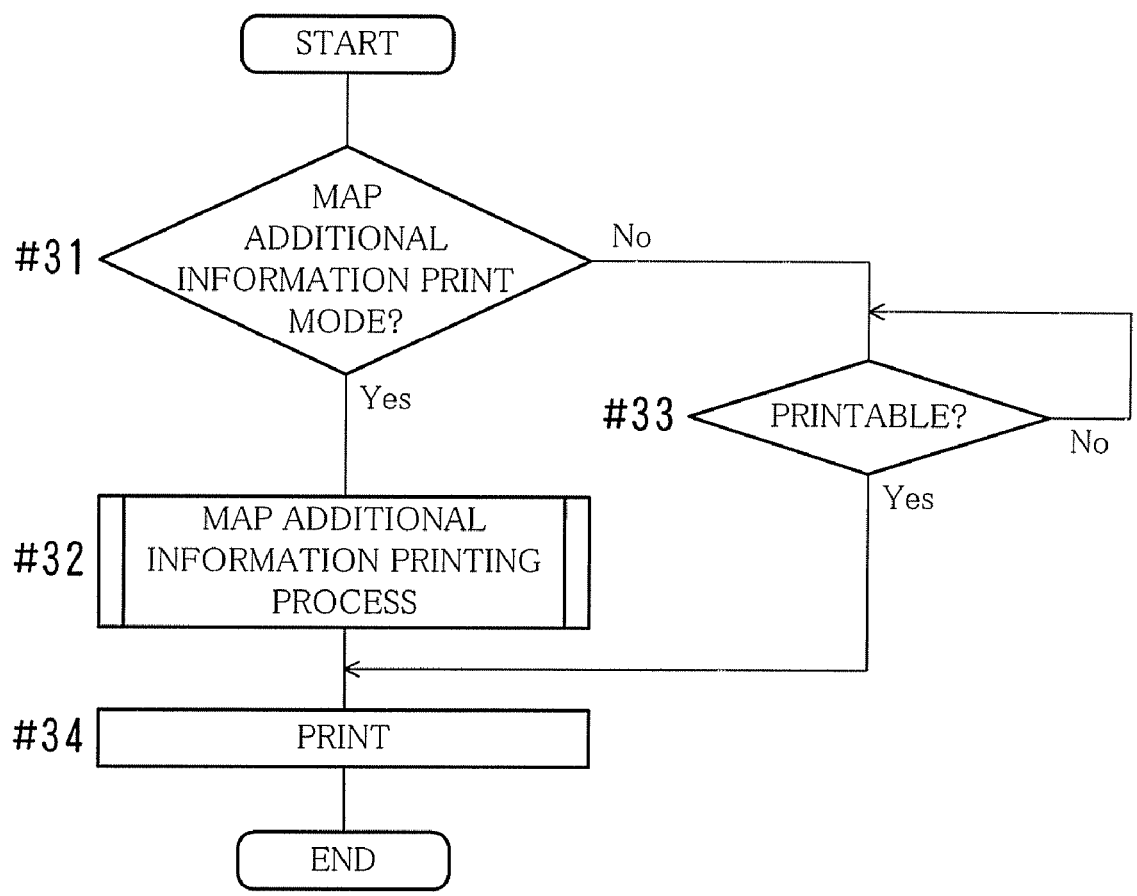
FIG. 11 is a flowchart illustrating an example of the flow of a process of combining additional information.
Figure 12:
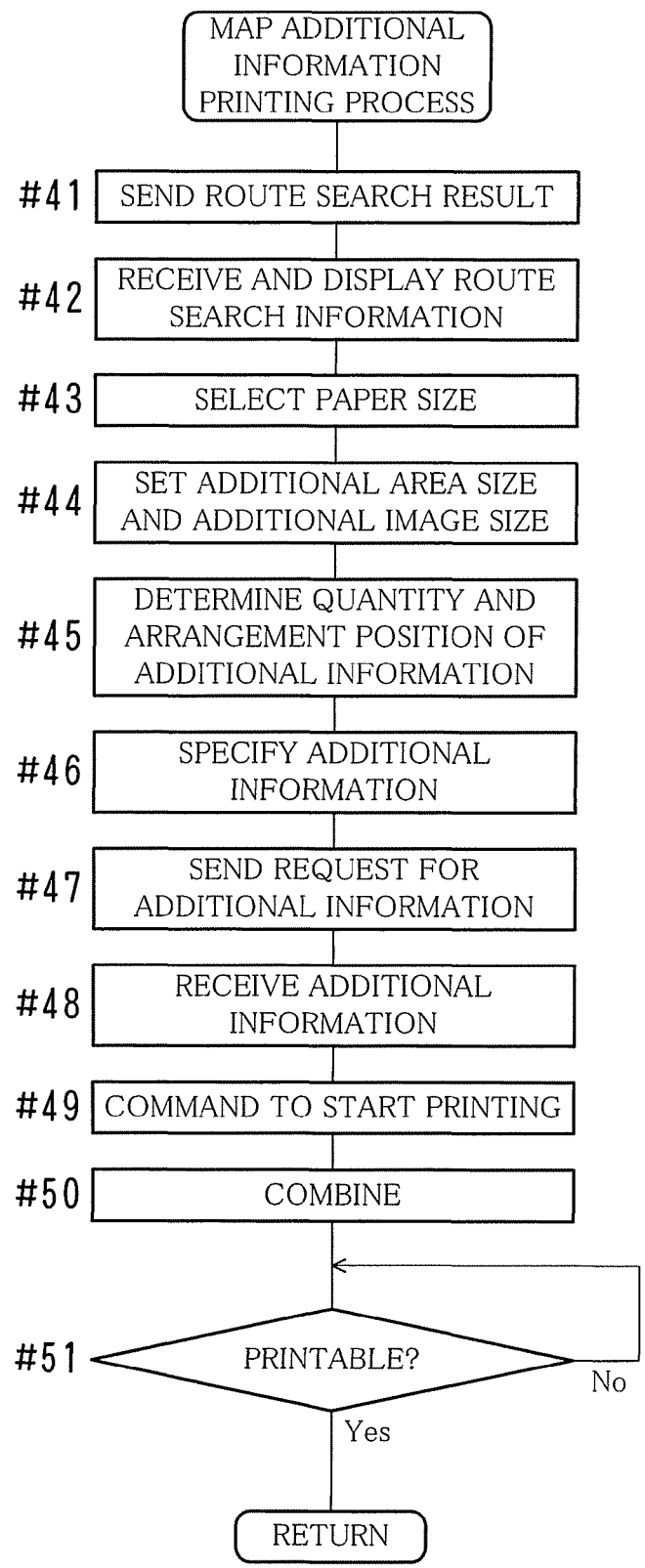
FIG. 12 is a flowchart illustrating an example of the flow of a map additional information printing process.

FIG. 11 is a flowchart illustrating an example of the flow of a process of combining additional information; and FIG. 12 is a flowchart illustrating an example of the flow of a map additional information printing process.

In this embodiment, when a user intends to incorporate, in an image included in route information indicating a route from a start point to a destination, an image included in additional information into an additional area HR that is an area other than an area including the route, he/she, first, presses the map additional information print mode key 41 (see FIG. 6).

Referring to FIG. 11, it is determined whether or not the map additional information print mode key 41 has been pressed (#31). If it is determined that the map additional information print mode key 41 has not been pressed (No in #31), which is a normal case of printing a Web page, then it is determined, for example, whether or not paper is present (#33), and the Web page is printed (#34).

Conversely, if it is determined that the map additional information print mode key 41 has been pressed (Yes in #31), then a map additional information printing process is performed (#32). The procedure for this process shall now be described with reference to FIG. 12.

Referring to FIG. 12, first, a route search request is sent to the server 1 (#41). Next, route information is received, and an image included in the route information is displayed (#42).

Then, a user selects a paper size (#43), and sets an additional area size and an additional image size (#44). Thereby, determination is made as to how much additional information can be added and as to where an image included in the additional information is to be arranged (#45).

Further, the user specifies additional information (#46), and information on the position, size, or scale ratio of the image included in the additional information is sent to the server 1 (#47).

When desired additional information is received from the server 1 (#48), an activation process for printing is performed (#49). Then, the image included in the route information is combined with the image included in the additional information based on an arrangement position determined by the position determination portion 22c and then to generate composite information (#50). After that, it is determined, for example, whether or not paper is present (#51), and an image included in the composite information is printed onto paper (#34 in FIG. 11). Note that the process of Step #49 may be performed after the process of Step #46.

In this embodiment, a start point and a destination are designated on a map. Instead, they may be set by entering the names of the start point and the destination or by selecting the same in the operational portion.

Second Embodiment

Figure 13:
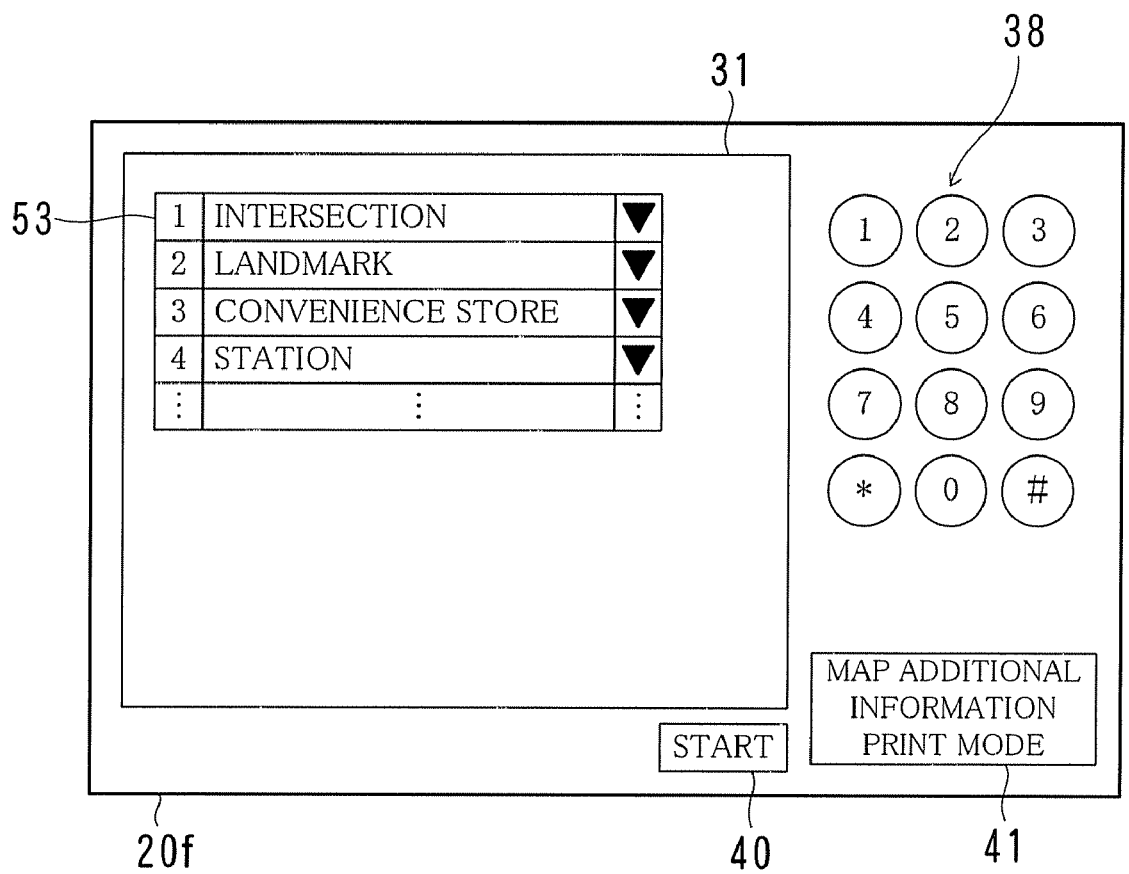
FIG. 13 is a diagram illustrating an example of a screen used when a priority of additional information to be added is set.
Figure 14:
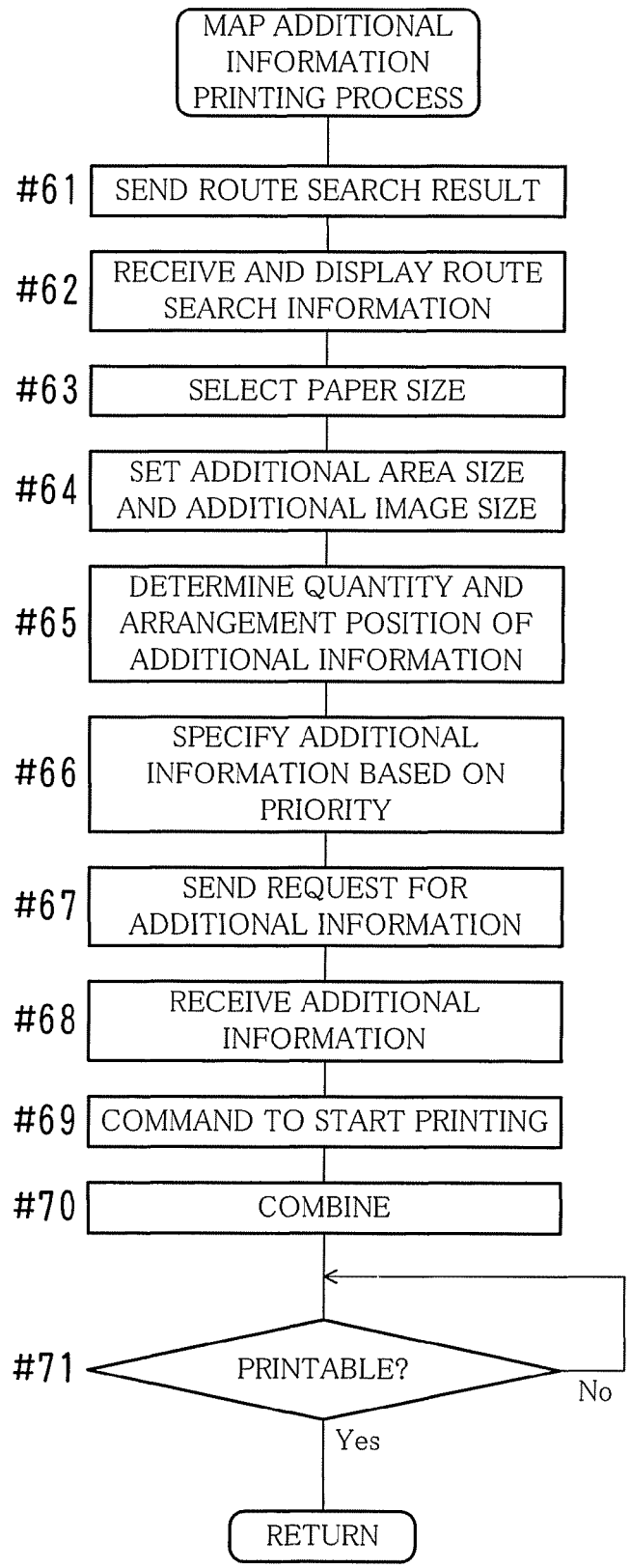
FIG. 14 is a flowchart illustrating another example of the flow of a map additional information printing process.

FIG. 13 is a diagram illustrating an example of a screen used when a priority of additional information to be added is set; and FIG. 14 is a flowchart illustrating another example of the flow of a map additional information printing process.

In the first embodiment, a user selects additional information. Instead, in the second embodiment, a priority selection portion 22d (see FIG. 2) automatically selects additional information based on a priority for each facility, located along the route, that has been set in advance by a user.

When a user presses the priority setting button 45 (see FIG. 7), as illustrated in FIG. 13, a drop-down priority selection button 53 appears on the display portion 31. The user can use the drop-down priority selection button 53 to designate a priority based on which additional information is added. For example, the user can designate, as a first priority, information on intersections along a route from a start point to a destination, and designate, as a second priority, information on landmarks along the route. Thereby, additional information corresponding to the information on intersections is added, taking precedence over additional information corresponding to the information on landmarks.

Referring to FIG. 14, first, a route search request is sent to the server 1 (#61). Next, route information is received, and an image included in the route information is displayed (#62).

Then, a user selects a paper size (#63), and sets an additional area size and an additional image size (#64). Thereby, determination is made as to how much additional information can be added and as to where an image included in the additional information is to be arranged (#65).

Further, the priority selection portion 22d specifies additional information based on the priority for each facility, located along the route, designated by the user (#66), and information on the position, size, or scale ratio of the image included in the additional information is sent to the server 1 (#67).

When additional information based on the priority is received from the server 1 (#68), an activation process for printing is performed (#69). Then, the image included in the route information is combined with the image included in the additional information based on an arrangement position determined by the position determination portion 22c and then to generate composite information (#70). After that, it is determined, for example, whether or not paper is present (#71), and an image included in the composite information is printed onto paper (#34 in FIG. 11). Note that the process of Step #69 may be performed after the process of Step #66.

Third Embodiment

Figure 15:
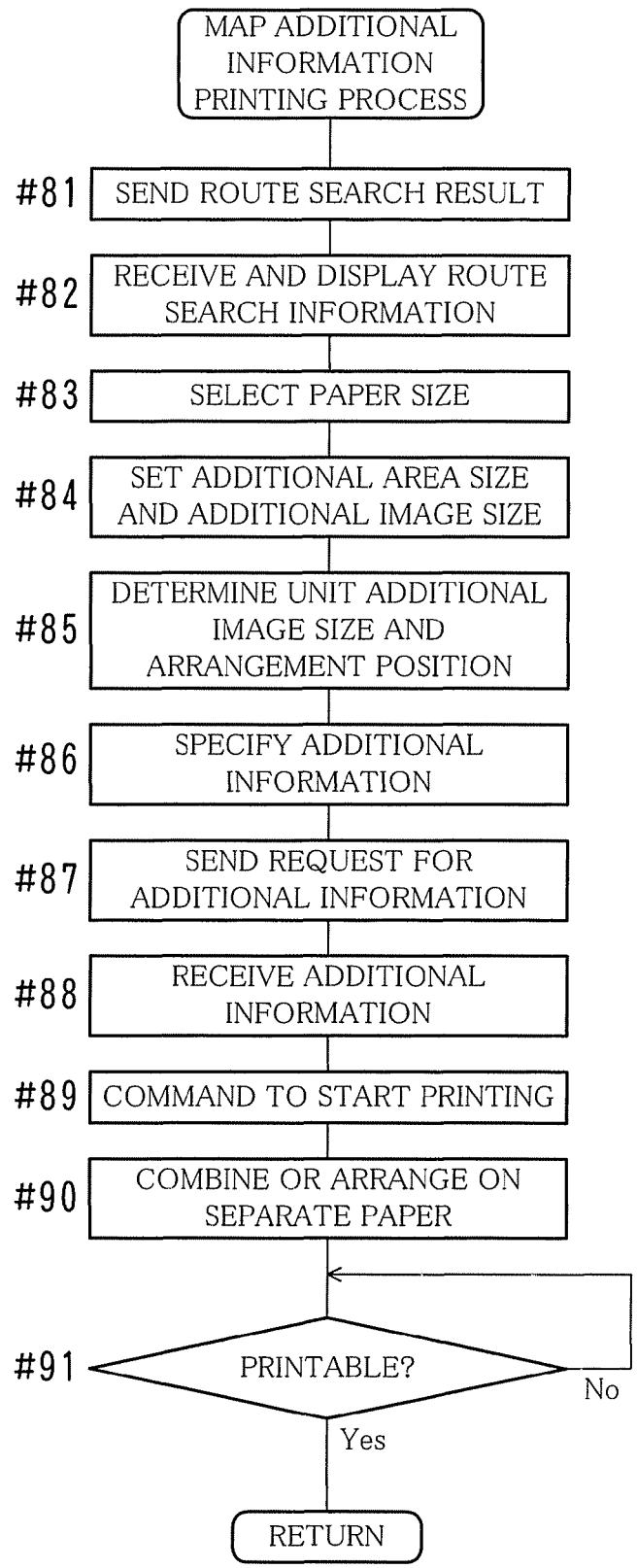
FIG. 15 is a flowchart illustrating yet another example of the flow of a map additional information printing process.

FIG. 15 is a flowchart illustrating yet another example of the flow of a map additional information printing process.

In the first embodiment, the number of images included in additional information that can be added is calculated based on an additional area size and an additional image size that are set by a user. In the third embodiment, a user sets an additional area size and the number of images included in additional information, and a second calculation portion 22b (see FIG. 2) calculates a unit additional image size corresponding to the size of a single image included in the additional information based on the additional area size and the number of images included in the additional information that are set by the user. If the unit additional image size thus calculated is equal to or lower than a preset lower limit value, then an image included in the additional information is enlarged and printed onto a separate sheet of paper without incorporating such an image into an additional area HR. This prevents the image included in the additional information from becoming less visible. The user can use the additional information quantity setting button 48 (see FIG. 7) to set the number of images included in the additional information, and also use the additional information lower limit value button 46 (see FIG. 7) to set a lower limit value of the unit additional image size.

Referring to FIG. 15, first, a route search request is sent to the server 1 (#81). Next, route information is received, and an image included in the route information is displayed (#82).

Then, a user selects a paper size (#83), and sets an additional area size and an additional information quantity (#84). Thereby, the unit additional image size and an arrangement position of an image included in additional information are determined (#85). In the process of Step #85, it is determined whether or not the unit additional image size is equal to or lower than the lower limit value. If the unit additional image size is equal to or lower than the lower limit value, an arrangement position is so determined that the image included in the additional information is enlarged, e.g., enlarged to the extent that the unit additional image size reaches the lower limit value, and arranged on a separate sheet of paper. In this case, the display portion 31 displays a message notifying that the image included in the additional information is arranged on a separate sheet of paper.

Further, the user specifies the additional information that corresponds to the additional information quantity previously set (#86), and information on the position, size, or scale ratio of the image to be included in the additional information is sent to the server 1 (#87).

When desired additional information is received from the server 1 (#88), an activation process for printing is performed (#89). Then, the image included in the route information is combined with the image included in the additional information, or, alternatively, the image included in the additional information is printed onto a separate sheet of paper, independently of the image included in the route information (#90). After that, it is determined, for example, whether or not paper is present (#91), and a printing process is performed (#34 in FIG. 11). Note that the process of Step #89 may be performed after the process of Step #86.

The image forming apparatus 2 according to the embodiments can incorporate, in the entire image included in route information indicating a route from a start point to a destination, an additional image into the entire image. To be specific, an image of an area other than an area including the route is replaced with the additional image. The additional image is included in additional information that enlarges and specifies a route point position, designated by the user, along the route. Then, the image forming apparatus 2 can print an image obtained by incorporating those images onto a sheet of paper.

As described above, an image included in additional information is incorporated into an additional area HR that is an area other than an area including a desired route, i.e., into an area less required by a user. This reduces the possibility of unnecessary waste of paper resources compared with a conventional case in which a desired enlarged map is printed separately from the entire map. Thus, a sheet of paper can be used more effectively than with conventional apparatuses/methods.

Further, it is unnecessary for a user to go to a destination with a plurality of printed materials, and to find a necessary map from among the plurality of printed materials.

Moreover, it is also unnecessary to know which part of the entire map an area of the enlarged map printed on the separate sheet of paper corresponds to, which facilitates the understanding of the map.

Thus, the image forming apparatus 2 can reduce unnecessary waste of paper resources and provide a printed material corresponding to an easy-to-use map as compared to conventional apparatuses/methods.

In the embodiments discussed above, the overall configuration of the image forming apparatus 2, the configurations of various portions thereof, the content to be processed, the processing order, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus configured to communicate with a server, the server providing route information indicating a route from a start point to a destination, the image forming apparatus comprising:
    a route information obtaining portion that obtains the route information from the server;
    an additional information obtaining portion that obtains, from the server, additional information relating to the route information;
    a synthesis portion that incorporates at least one image included in the additional information into a first area that is contained in an image included in the route information and that excludes the route, and generates composite information;
    a calculation portion that calculates, based on size information, a maximum quantity of the additional information images which can be incorporated into the first area;
    an input portion that receives from a user a quantity of the additional information images to be incorporated into the first area, the quantity being less than or equal to the maximum quantity calculated by the calculation portion; and
    a printer that prints an image based on the composite information generated by the synthesis portion onto a recording medium.

2. The image forming apparatus according to claim 1, wherein the additional information is information for enlarging and specifying a route point position along the route and its vicinity.

3. The image forming apparatus according to claim 1, further comprising
    an additional area size setting portion that sets an additional area size corresponding to a size of a second area into which the at least one image included in the additional information is incorporated, the second area being included in the first area,
    an additional image size setting portion that sets an additional image size corresponding to a size of the at least one image included in the additional information,
    wherein the size information comprises the additional area size and the additional image size,
    wherein the calculation portion calculates, based on the additional area size and the additional image size, the quantity of the additional information images which can be incorporated into the second area,
    a first specifying portion through which a user specifies the additional information whose quantity is equal to or less than the quantity calculated by the calculation portion, and
    wherein the synthesis portion combines the additional information specified by the first specifying portion and the route information.

4. The image forming apparatus according to claim 3, further comprising a position determination portion that determines, based on the additional area size and the additional image size, a position in which the at least one additional information image is incorporated.

5. The image forming apparatus according to claim 1, further comprising a scale ratio designation portion that designates a scale ratio of the image included in the additional information.

6. The image forming apparatus according to claim 3, further comprising
    a priority setting portion that sets, for each facility located along the route, a priority to incorporate the image included in the additional information, and a second specifying portion that specifies, based on the priority, the additional information whose quantity is equal to or less than the quantity calculated by the first calculation portion.

7. The image forming apparatus according to claim 1, further comprising
an additional area size setting portion that sets an additional area size corresponding to a size of a second area into which the image included in the additional information is incorporated, the second area being included in the first area,
an additional image quantity setting portion that sets a quantity of the image included in the additional information to be incorporated into the second area,
a second calculation portion that calculates, based on the additional area size and the quantity, a unit additional image size corresponding to a size of a single image included in the additional information, and
a lower limit value setting portion that sets a lower limit value of the unit additional image size,
wherein the synthesis portion arranges the image included in the additional information onto a separate sheet of paper without incorporating the image included in the additional information into the first area if the unit additional image size calculated by the second calculation portion is equal to or less than the lower limit value set by the lower limit value setting portion.

8. The image forming apparatus according to claim 7, further comprising a notifying portion that outputs a message indicating that the unit additional image size calculated by the second calculation portion is equal to or less than the lower limit value set by the lower limit value setting portion.

9. The image forming apparatus according to claim 1, wherein the size information comprises:
a proportion of the printed image to be covered by the first area; and
a horizontal and vertical length of the at least one additional information image to be incorporated into the first area.

10. The image forming apparatus according to claim 1, wherein the size information is specified by the user.

11. An image forming method for performing an image forming process by communicating with a server, the server providing route information indicating a route from a start point to a destination, the image forming method comprising:
a route information obtaining step of obtaining the route information from the server;
an additional information obtaining step of obtaining, from the server, additional information relating to the route information;
a synthesis step of incorporating at least one image included in the additional information into a first area that is contained in an image included in the route information and that excludes the route and then to generate composite information;
a calculation step of calculating, based on size information, a maximum quantity of the additional information images which can be incorporated into the first area;
a receiving step of receiving from a user a quantity of the additional information images to be incorporated into the first area, the quantity being less than or equal to the calculated maximum quantity; and
a print step of printing an image based on the composite information thus generated onto a recording medium.

12. The image forming method according to claim 11, wherein the additional information is information for enlarging and specifying a route point position along the route and its vicinity.

13. The image forming method according to claim 11, further comprising
an additional area size setting step of setting an additional area size corresponding to a size of a second area into which the at least one image included in the additional information is incorporated, the second area being included in the first area,
an additional image size setting step of setting an additional image size corresponding to a size of the at least one image included in the additional information,
wherein the size information comprises the additional area size and the additional image size,
wherein the calculation step comprises calculating, based on the additional area size and the additional image size, the quantity of the additional information images which can be incorporated into the second area,
a first specifying step through which a user specifies the additional information whose quantity is equal to or less than the quantity calculated in the calculation step, and
wherein, in the synthesis step, the additional information specified in the first specifying step is combined with the route information.

14. The image forming method according to claim 13, further comprising a position determination step of determining, based on the additional area size and the additional image size, a position in which the image included in the additional information is incorporated.

15. The image forming method according to claim 11, further comprising a scale ratio designation step of designating a scale ratio of the image included in the additional information.

16. The image forming method according to claim 13, further comprising
a priority setting step of setting, for each facility located along the route, a priority to incorporate the image included in the additional information, and
a second specifying step of specifying, based on the priority, the additional information whose quantity is equal to or less than the quantity calculated in the first calculation step.

17. The image forming method according to claim 11, further comprising
an additional area size setting step of setting an additional area size corresponding to a size of a second area into which the image included in the additional information is incorporated, the second area being included in the first area,
an additional image quantity setting step of setting a quantity of the image included in the additional information to be incorporated into the second area,
a second calculation step of calculating, based on the additional area size and the quantity, a unit additional image size corresponding to a size of a single image included in the additional information, and
a lower limit value setting step of setting a lower limit value of the unit additional image size,
wherein, in the synthesis step, the image included in the additional information is arranged onto a separate sheet of paper without being incorporated into the first area if the unit additional image size calculated in the second calculation step is equal to or less than the lower limit value set in the lower limit value setting step.

18. The image forming method according to claim 17, further comprising a notifying step of outputting a message indicating that the unit additional image size calculated in the second calculation step is equal to or less than the lower limit value set in the lower limit value setting step.

19. The image forming method according to claim 11, wherein the size information comprises:
- a proportion of the printed image to be covered by the first area; and
- a horizontal and vertical length of the at least one additional information image to be incorporated into the first area.

20. The image forming method according to claim 11, wherein the size information is specified by the user.

* * * * *